(12) United States Patent
Bordes et al.

(10) Patent No.: US 7,475,001 B2
(45) Date of Patent: Jan. 6, 2009

(54) SOFTWARE PACKAGE DEFINITION FOR PPU ENABLED SYSTEM

(75) Inventors: Jean Pierre Bordes, St. Charles, MO (US); Steven J. Borho, St. Charles, MO (US)

(73) Assignee: NVIDIA Corporation, Santa Clara, CA (US)

( * ) Notice: Subject to any disclaimer, the term of this patent is extended or adjusted under 35 U.S.C. 154(b) by 484 days.

(21) Appl. No.: 10/982,764

(22) Filed: Nov. 8, 2004

(65) Prior Publication Data

US 2006/0100835 A1 May 11, 2006

(51) Int. Cl.
*G06F 9/45* (2006.01)
(52) U.S. Cl. ................ 703/22; 703/13; 712/1
(58) Field of Classification Search ........... 703/2, 703/13, 22; 712/2, 1; 463/1
See application file for complete search history.

(56) References Cited

U.S. PATENT DOCUMENTS

| | | | |
|---|---|---|---|
| 5,664,162 A | 9/1997 | Dye | |
| 5,721,834 A | 2/1998 | Milhaupt et al. | |
| 5,812,147 A | 9/1998 | Van Hook et al. | |
| 5,841,444 A | 11/1998 | Mun et al. | |
| 5,938,530 A | 8/1999 | Watanabe | |
| 5,966,528 A | 10/1999 | Wilkinson et al. | |
| 6,058,465 A | 5/2000 | Nguyen | |
| 6,425,822 B1 | 7/2002 | Hayashida et al. | |
| 6,466,898 B1 | 10/2002 | Chan | |
| 6,570,571 B1 | 5/2003 | Morozumi | |
| 6,823,518 B1 | 11/2004 | Bliss et al. | |
| 6,966,837 B1 | 11/2005 | Best | |
| 7,120,653 B2 | 10/2006 | Alfieri et al. | |
| 2003/0117397 A1 | 6/2003 | Hubrecht et al. | |
| 2004/0075623 A1 | 4/2004 | Hartman | |
| 2005/0041031 A1 | 2/2005 | Diard | |
| 2005/0075154 A1* | 4/2005 | Bordes et al. ............ 463/1 |
| 2005/0075849 A1* | 4/2005 | Maher et al. ............ 703/2 |
| 2005/0086040 A1* | 4/2005 | Davis et al. ............ 703/22 |
| 2005/0223383 A1 | 10/2005 | Tetrick | |
| 2005/0251644 A1* | 11/2005 | Maher et al. ............ 712/2 |
| 2006/0129371 A1 | 6/2006 | Orofino et al. | |
| 2006/0155552 A1 | 7/2006 | Chen et al. | |

OTHER PUBLICATIONS

Grzeszczuk et al., R. NeuroAnimator: Fast Neural Network Emulation and Control of Physics-Based Models, Proceedings of the 25th Annual Conference on Computer Graphics and Interactive Techniques SIGGRAPH '98, Jul. 1998, pp. 1-12.*

* cited by examiner

*Primary Examiner*—Russell Frejd
(74) *Attorney, Agent, or Firm*—Patterson & Sheridan, L.L.P.

(57) ABSTRACT

A PPU enhanced system stores software packages implementing, at least in part, a physics subroutine. The package being implemented as a plurality of modules, at least one module being stored and executed on a host system and another module being stored and executed on the PPU.

35 Claims, 9 Drawing Sheets

SOFTWARE PACKAGE DEFINITION FOR PPU ENABLED SYSTEM

This application is related to commonly-assigned U.S. patent application Ser. No. 10/715,459 filed Nov. 19, 2003; U.S. patent application Ser. No. 10/839,155 filed May 6, 2004, and U.S. patent application Ser. No. 10/982,791 filed Nov. 8, 2004. The subject matter of these related applications is hereby incorporated by reference.

BACKGROUND OF THE INVENTION

The present invention relates generally to systems running applications that benefit from the incorporation of physics-based animations or physics data. More particularly, the present invention relates to software package structures and operating methodologies for Physics Processing Unit (PPU) enhanced systems.

Historically, the demand for realistic looking, physics-based animations has been met to a limited degree by so-called physics engines which supplement the programming code used to implement conventional applications. Indeed, a market has recently emerged directed to the development of physics engines or so-called "physics middleware."

Conventional software based physics engines allow programmers increased latitude to assign virtual mass and coefficients of friction to objects animated within the execution of the main application. Similarly, virtual forces, impulses, and torques may be applied to objects. In effect, software-based physics engines provide programmers with a library of procedures to simplify the visual creation of scenes having physics-based interaction between objects.

Unfortunately, the growing appetite for animated realism in applications can not be met by merely providing additional specialty software, and thereby layering upon the CPU additional processing requirements. This is true regardless of the relative sophistication of the specialty software.

As a result, PPU enhanced systems have recently been developed. Systems readily adapted to PPU enhancement include, as examples, Personal Computers (PCs) and game consoles. Generally speaking, the performance capabilities of a conventional Central Processing Unit (CPU), such as a Pentium® or similar microprocessor, is enhanced by the additional provision of a PPU. Several exemplary embodiments of basic, PPU-enhanced system are disclosed in related U.S. patent applications Ser. No. 10/715,459 filed Nov. 19, 2003 and Ser. No. 10/839,155 filed May 6, 2004.

The term "PPU-enhanced" generally describes any system incorporating a PPU to generate physics data for consumption by a main application running on a CPU. "Physics data" comprises any data or data structure related to a mathematical algorithm or logical/mathematical expression adapted to solve a physics problem or express a physics relationship.

Any set of logical computations or algorithms operating upon physics data is termed a physics "simulation." A simulation generally runs on the PPU in cooperation with the CPU to generate a body of physics data that accurately defines the movement and/or interaction of objects and features in an animated scene displayed by a peripheral device associated with the system. So, in one sense the physics simulation run on the PPU can be said to visually enhance the animation of a scene generated by the main application running on the CPU.

Such computationally derived physical animations form an increasingly important aspect of numerous applications. Computer games are an excellent example of applications that benefit from the added realism of animations derived from a defined set of physics-based inputs, parameters, and data. The term "animation" is used here to generally describe any visual representation of an event. The term "physics-based animation" refers to any animation derived, at least in part, from one or more computational processes operating upon physics data that defines a physical characteristic or behavior. A simulation is often said to drive the resulting animation. However, the direct relationship between simulation and animation, and the fact that the underlying simulation is not apparent to the system user typically results in an alternative use for the terms animation and simulation.

Cutting edge applications generally demand that physics-based animations, and the underlying simulations run in real-time. This requirement poses a significant problem for conventional systems. For example, conventional PCs are able to resolve only a limited amount of physics data in the time allowed by real time animation frame rates. This disability arises from structural limitations in the CPU architecture, data transfer bandwidth limitations, and the computational workload placed upon the CPU by other processes inherent in the execution of the main application.

For clarity of reference, the term "system" subsumes the term "host system." A system may include a PPU, whereas the term "host system" generally refers to the combination of at least a CPU and an associated main memory. This combination of "host system" elements interacts with the PPU in a system.

PPU enhanced system resources typically brought to bear on the problem of a physics-based animation are conceptually illustrated in FIG. 1. In FIG. 1, CPU 1 together with its associated drivers and internal memories, access data from a main system memory 2, and/or one or more peripheral devices 3. A Graphics Processing Unit (GPU) 4 with its associated memory 4A and a PPU 5 with its associated memory 5A, send data to and receive data from main memory 2.

Specific memory architectures are legion in number. The term "main memory" generally refers to any collection of data storage elements associated with the CPU and typically includes at least various types of Random Access Memory (RAM), related data registers, caches, and buffers.

A main application 7 is typically loaded from a peripheral 3 and runs, at least in part, from main memory 2 using CPU resources. Many contemporary applications include significant graphics content and are intended to run with the aid of separate GPU 4. GPUs are well know in the industry and are specifically designed to run in cooperation with a CPU to create (or "render") animations having a three dimensional (3-D) quality. As a result, main application 7 accesses one or more graphical rendering subroutines associated with GPU 4 using an Application Programming Interface (API) and related drivers 9. Similarly, one or more physics subroutines associated with PPU 5 are accessed using a PPU API and related drivers 8.

An API is a well understood programming technique used to establish a lexicon of command instructions by which one piece of software may "call" another piece of software. The term "call" as variously used hereafter broadly describes any interaction by which one piece of software causes the retrieval, storage, indexing, update, etc., of another piece of software, or the execution of a computational process in firmware or hardware. The term "run" describes any process in which hardware resources act upon data under the direction of a software resource.

PPU enhancement of a system implicates a number of changes in the way application software and related physics routines are defined and implemented. Non-PPU enhanced systems have the luxury of a single computational platform synchronously executing both application and related physics middleware. This is not the case for PPU enhanced systems. Thus, new approaches to the definition and operation of software components is required.

SUMMARY OF THE INVENTION

The present invention provides in this regard a PPU enhanced system having a host system running a main application and a PPU running a physics subroutine in parallel. The package implementing the physics subroutine comprises at least a host system-resident package portion preferably stored in main memory and a related PPU-resident package portion preferably stored in PPU main memory, wherein the PPU-resident package portion generally comprises at least one PPU-resident Computation Module (PCM).

Normally, the system stores a plurality of packages, wherein each one of the plurality of packages implements, at least in part, one physics subroutine. Each one of the plurality of packages comprises a plurality of modules generally including a north-facing module having a northbound API and a south-facing module having a southbound API.

In a PPU comprising a DME, PCE, and one or more VPEs, as described hereafter for example, the PCE generally causes at least some portion of a PCM to be transferred from the PPU main memory to a primary memory associated with the VPE. Often, the VPE is associated with an MCU and a corresponding secondary memory adapted to store a related portion of the PCM.

Respective VPEs typically define computational lane resources for the execution of an assigned PCM. In this regard, a PCE module related to the PCM is stored in a memory associated with the PCE. By execution of this PCE module, the PCM may be loaded and executed with an assigned lane.

For example, each PCM typically includes one or more Lane Computation Module (LCM) ultimately stored in one or more primary memories associated with computational units in the VPE. In a related aspect, the VPE may also include a Memory Control Unit (MCU) having an associated secondary memory storing yet another portion of the PCM.

The present invention also provides in a related aspect, a method of loading a package implementing, at least in part, a physics subroutine on a similar PPU enhanced system. This method generally comprises storing a host system-resident module in a main memory, transferring a plurality PCMs from the host system to the PPU, and thereafter storing the plurality of PCMs in a main PPU memory. Once the PCMs are stored in PPU main memory, the method selects a first PCM and allocates computational lane resources within the PPU in relation to the first selected PCM.

In a related aspect, the method provides for the generation in the host system of a task list identifying the plurality of PCMs to be executed and defining an execution sequence as between included PCMs. Lane resources are sequentially re-allocated in accordance with the task list defined sequence.

BRIEF DESCRIPTION OF THE DRAWINGS

The drawings, taken together with the foregoing discussion, the detailed description that follows, and the attached describe several preferred embodiments of the present invention. The drawings include the following.

DETAILED DESCRIPTION OF THE PREFERRED EMBODIMENT(S)

Figure 1:
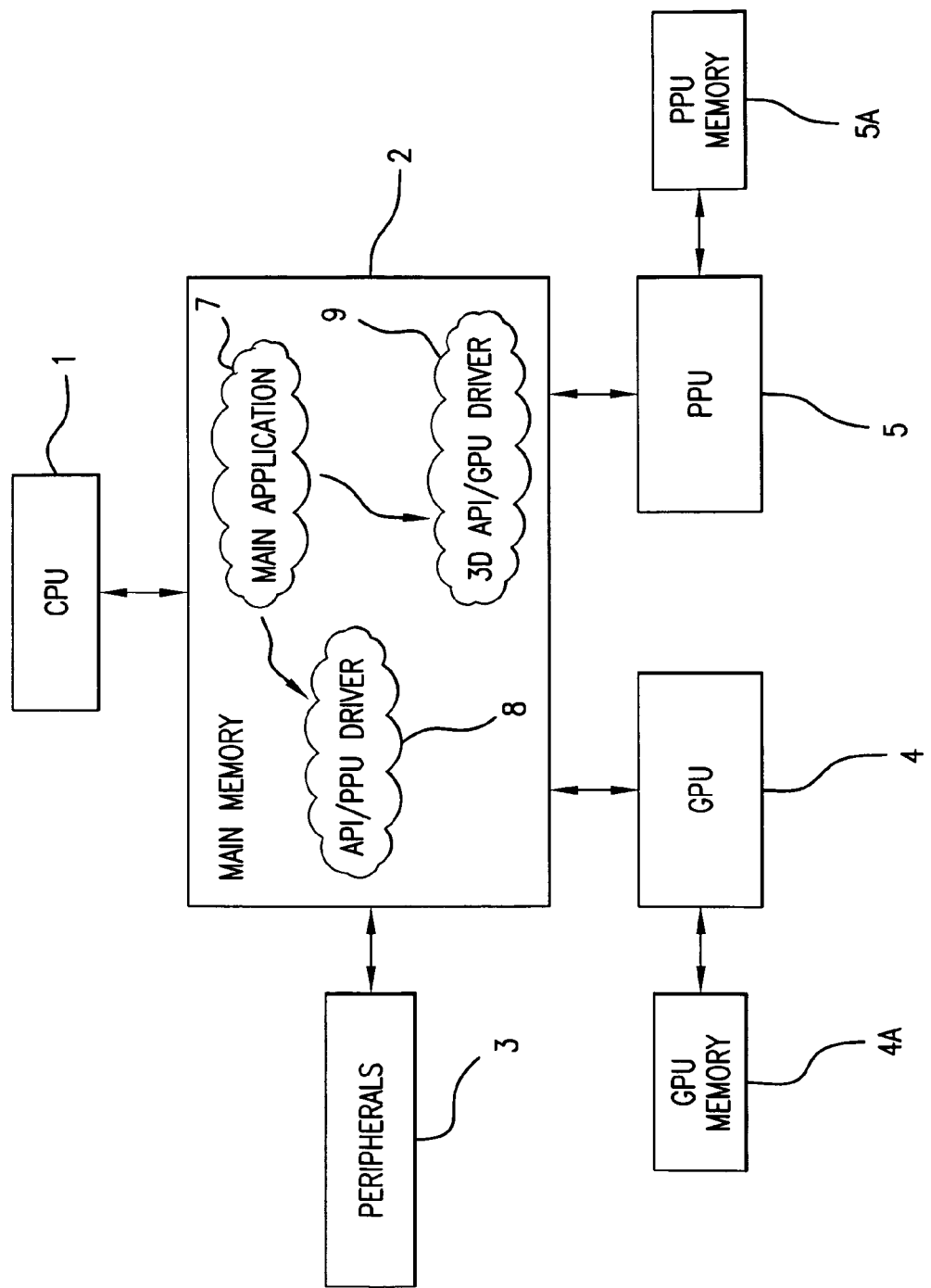
FIG. 1 is a conceptual illustration of the principal hardware and software components forming a PPU enhanced system readily adapted to the present invention.

The present invention recognizes that conventional software-based solutions to physics simulations have limits that affect their practical usefulness within the execution of emerging applications. Applications, such as PC and console games, would benefit considerably by including in real-time many more active objects and related forces than can be reasonably simulated using specialty software run on a general purpose CPU.

Thus, the present invention approaches the problem of generating visually realistic physics animations, and therefore executing the underlying physics simulation(s), from an entirely different perspective. Unlike conventional software-based solutions, the present invention relies of a hardware-based Physics Processing Unit (PPU). A PPU implemented in accordance with the present invention may be viewed in one aspect as a specialty co-processor. In cooperation with the general purpose CPU provided by a host system, the PPU provides the enormous, additional, and highly specialized processing capabilities required to implement complex, real-time, physics simulations.

As noted above, the present invention is related to concurrently filed U.S. application Ser. No. 10/982,791 filed Nov. 8, 2004. This related application describes in several aspects the asynchronous and parallel execution of a main application running on a host system with the execution of one or more physics subroutines running on a PPU. By running the main application, at least in significant part, in parallel with related physics subroutines, the execution of the main application becomes relatively asynchronous in relation to the execution to the physics subroutines.

However, parallel execution of the main application and related physics subroutines requires careful design of both the main application and the related physics subroutines. It also requires careful consideration of the uniquely common and numerous data structures implicated in a physics simulation, as well as the problems associated with transferring and maintaining the physics data between the host system and PPU. The concurrently filed application Ser. No. 10/982,791 describes in some additional detail several considerations related to the transfer and maintenance of physics data between the host system and PPU. In one aspect, the present invention describes several software considerations implicated in the parallel and substantially asynchronous execution of the main application and related physics subroutines.

The term "physics subroutine" is used to generally describe any software, or portion of software implementing all or part of a physics-based simulation. Any number of features, objects and/or effects may result in a physics-enhanced animation from the execution of a physics subroutine. Examples of physics subroutines includes; collision detection, rigid body dynamics, volumetric fluid (or smooth particle hydrodynamics), cloth, clothing, hair, fire, smoke, fracture, and deformable body dynamics. Each physics subroutines need not implement a physics-based simulation in its entirety or even an entire effect. Rather, a group of defined physics subroutine typically combine to implement a physics-based simulation.

As has been noted, the exact construct, content, and style of various physics subroutines will vary by software designer, application, and system. Generally speaking, however, physics subroutines will be implemented in one or more logically partitioned sets called, for purposes of this description, "packages." One package may implement one or multiple physics subroutines. Multiple packages may cooperate to implement relatively larger physics subroutines. The logical partitioning of software code into individually identifiable packages and thereafter into constituent modules typically has as much to do with processes involved in writing the software as with the processes involved in the running of the software on a system. Needless to say, specific implementations will vary greatly.

Figure 2:
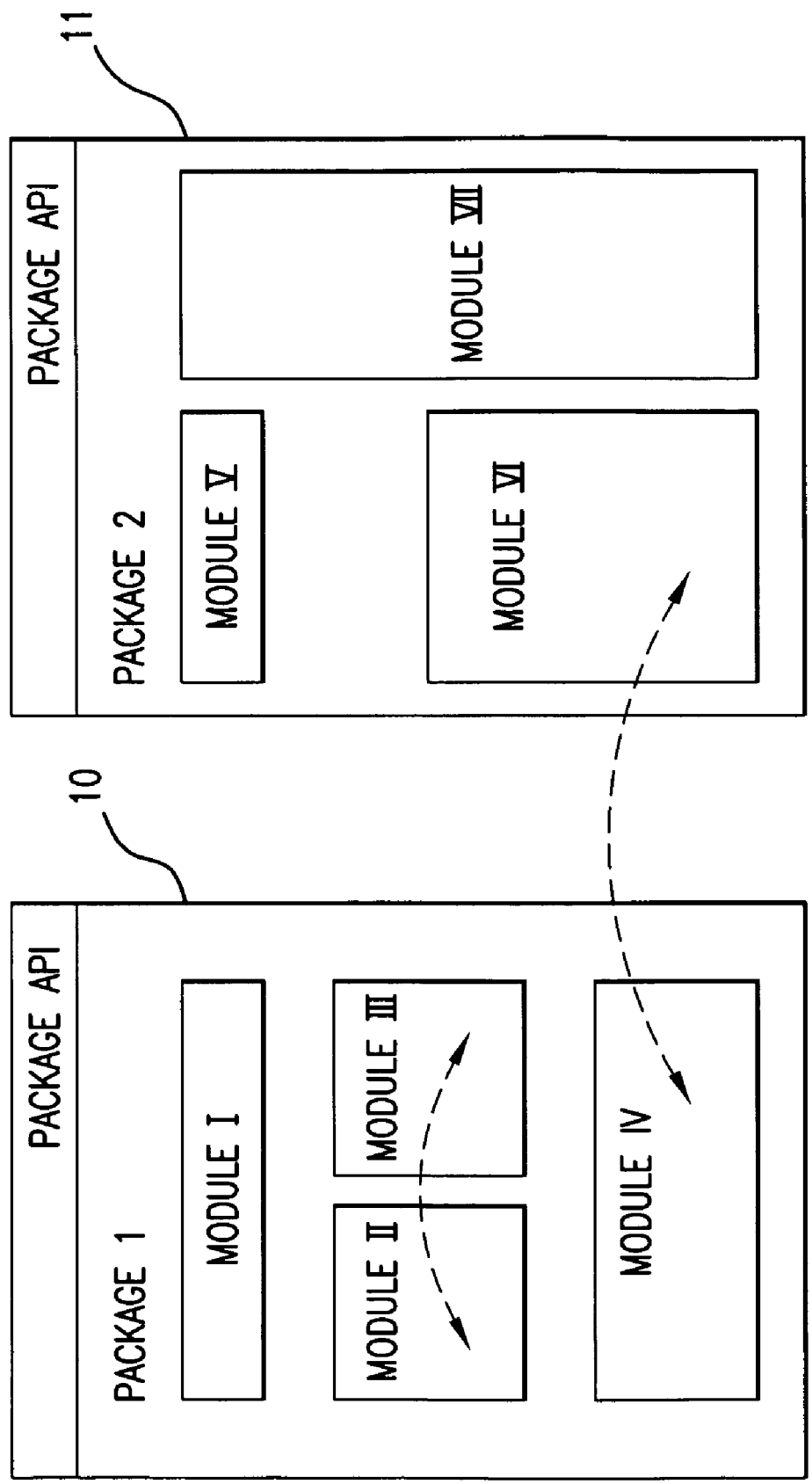
FIG. 2 is a conceptual illustration of software packages and related modules.

FIG. 2 conceptually illustrates generic packages 10 and 11. Each package comprises two or more modules. A "module" is any portion of a package. Seven (I-VII) modules are shown in FIG. 2. Naturally, a module may contain one or more coherently defined sub-modules (not shown), but for purposes of this description all sub-portions of a package are terms modules. Some modules may be related in the execution or invocation via a particular command. For example, modules II and III in package 1 are always executed in sequence once module II is called. Other modules may be related to one or more modules residing in separate package(s). For example, module VI in package 2 is run following execution of module IV in package 1. Calls to various packages are generally made through one or more associated API(s). As presently preferred, each package is associated with at least one API.

The execution of physics subroutines on a PPU in parallel with the execution of a main application on a host system presents some unique software programming challenges. The main application asynchronously calls the various physics subroutines from time to time during its execution. Thus, the CPU executing the main application requires access (typically through APIs) to the physics subroutines. However, as presently preferred, the PPU executes the great bulk of the computational and logical operations required to generate the physics data sought by the main application. Thus, the PPU requires executable access to considerable portions of the programming code forming the physics subroutines.

Figure 3:
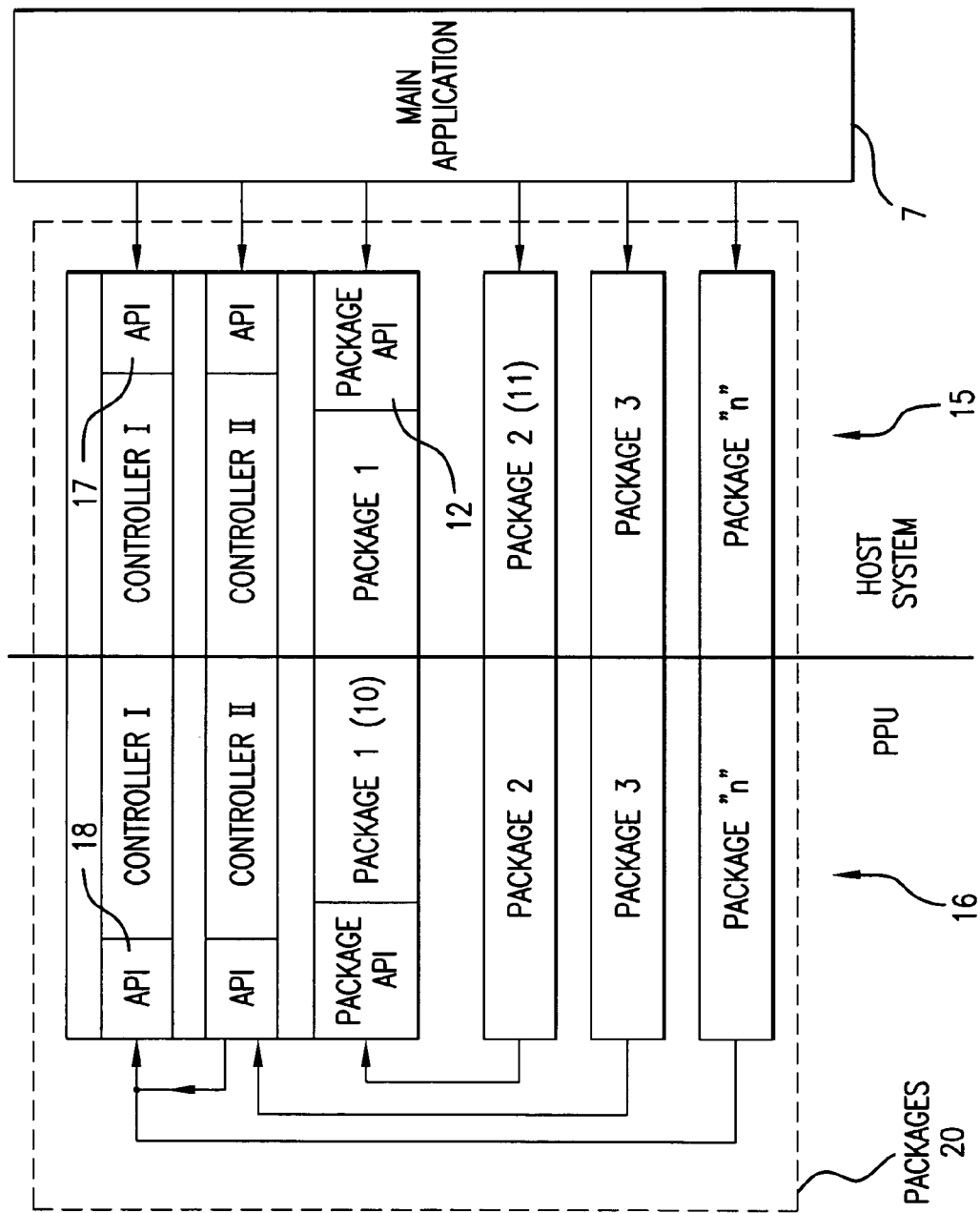
FIG. 3 is a conceptual illustration of software packages and related modules, including controller modules, as applied to an exemplary PPU enhanced system.

FIG. 3 conceptually illustrates the implementation of packages (1 through "n") 20 on a PPU enhanced system. As noted with respect to FIG. 1, main application 7 generally interfaces with a package 1 through an API 12. As presently preferred, the various packages are downloaded, at least in part, to main memory 2 from one or more of peripherals 3 or an external data source such as the Internet. From main memory 2, selected code portions from at least one of the packages 20 are transferred to PPU 5 and stored in PPU memory 5A. An exemplary process adapted to transfer the selected package code portions from the host system to PPU 5 and store of these code portions in PPU memory 5A is described in greater detail below.

For the present description it should be noted that each package is generally implemented in the system in at least two generalized portions; a host system-resident portion 15, and a PPU-resident portion 16. The relative size of the host system-resident portions and PPU-resident portions will vary widely. For example, some portions will include only a minimal API. Other portions will include significant quantities of executable programming code. However, taken in combination, these two general portions implement a complete package within the system by functionally straddling and logically cooperating across the hardware boundary between the host system and the PPU. Host-system resident package portions 15 interface with at least host system resources controlled by execution of the main application and/or the host system operating system. PPU-resident package portions 16 interface with at least PPU resources controlled by control logic resident in the PPU and/or executable code contained in one or more PPU-resident package portions.

In a related aspect, the constituent modules forming each package and/or constituent package portions are said to comprises a north facing portion and a south facing portion. "North-facing" generally refers to host system-resident package and modules portions, while "south-facing" generally refers to PPU-resident package and module portions. Each host-system resident package portion functionally comprises one or more north-facing module portions. Similarly, each PPU-resident package portion comprises one or more south facing module portions. Like host-system package portions, north-facing modules are preferably adapted to interface with host system resources controlled by execution of the main application. As presently preferred, each package is respectively associated with an API. This association is generally a one-for-one association, but it need not be. For example, multiple packages may be grouped in association with a single API. Similarly, multiple APIs may be used to interface with a single package.

In yet another related aspect, each package may be associated with a northbound API (e.g., 17) and a southbound API (e.g., 18). The respective northbound APIs 17 form the interface with the main application. The respective southbound APIs form an interface between south-facing package portions. In this manner, PPU-resident package portions and their constituent modules are able to call other packages.

Additionally, certain modules defined within a package are termed "controller" modules. A controller module is typically associated with a specific object, feature or effect within the physics simulation. In order to invoke the associated object, feature or effect within a package (or between packages) the corresponding controller module is called through its API. Like other modules, controller modules may include a north-facing portion with associated API 17 and/or a south-facing portion with associated API 18.

The ability of one PPU-resident package portion to call another PPU-resident package portion or a PPU-resident controller module further optimizes the parallel execution of the main application on the host system with the parallel execution of one or more physics subroutines on the PPU. For example, a rigid body dynamics subroutine might routinely query a collision detection subroutine during its execution. Such a query requires no intervention or command from the host system CPU. Thus, the PPU is able to independently store, maintain, and execute the inter-related software resources required to execute the physics subroutines.

For example, with reference to FIG. 3, the PPU-resident portion of package 3 is assumed to be running of the PPU. At some point during the execution of package 3, an effect associated with controller module II in package 1 is called. Package 3 is able to call controller module II through its associated API without intervention by the host system CPU.

However, before any physics subroutine can be executed using PPU-resident resources, the constituent packages and modules must first be loaded from the host system to the PPU execution environment. A discussion of this process first requires an exemplary hardware context.

Figure 4:
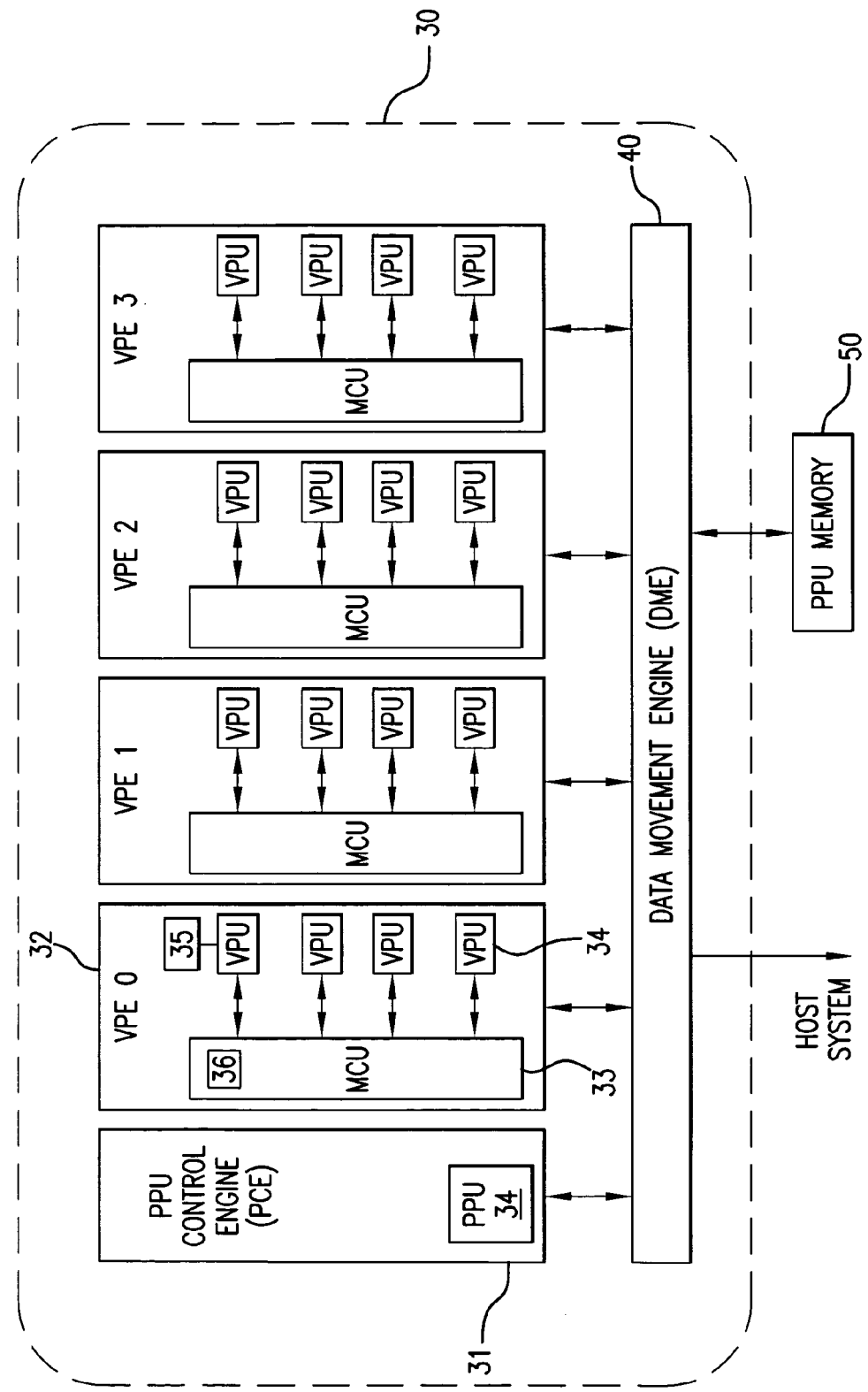
FIG. 4 further illustrates one exemplary embodiment of a PPU adapted to the present invention.

An exemplary embodiment of a PPU is shown in FIG. 4. Here, data transfer and data processing elements are combined in a hardware architecture characterized by the presence of multiple, independent vector processors. As presently preferred, the illustrated architecture is provided by means of an Application Specific Integrated Circuit (ASIC) connected to (or connected within) a host system. Whether implemented in a single chip or a chip set, together with its associated memory resources, this hardware is hereafter generically referred to as a PPU.

Of note, the circuits and components described below are functionally partitioned for ease of explanation. Those of ordinary skill in the art will recognize that a certain amount of arbitrary line drawing is necessary in order to form a coherent description. However, the functionality described in the following examples might be otherwise combined and/or further partitioned in actual implementation by individual adaptations of the example described herein. This well understood reality is true for not only the respective PPU functions, but also for the boundaries between the specific hardware and software elements in the exemplary embodiment. Many routine design choices between software, hardware, and/or firmware are left to individual system designers.

For example, the expanded parallelism characterizing the exemplary PPU 30 necessarily implicates a number of individual data processing units. A term "data processing unit" refers to a lower level grouping of mathematical/logic execution units (e.g., floating point processors and/or scalar processors) that preferably access data from at least a "primary memory," (i.e., a lower level memory in a hierarchy of memories within the PPU). Effective control of the numerous, parallel data processing units requires some organization or control designation. Any reasonable collection of data processing units is termed hereafter a "Vector Processing Engine (VPE)" 32. The combination of all VPEs may be referred to in one context as a Floating Point Engine (FPE). However, the terms "floating point" and "vector" should be read as generally descriptive but not exclusionary. For example, physics data is typically, but not completely characterized by vector data structures. Further, the expanded parallelism of the exemplary PPU is designed in one aspect to address the problem of numerous, parallel, mathematical/logic operations applied to vector data. However, the computational functionality of a VPE is not limited to only floating-point vector operations. Indeed, practical PPU implementations must also provide efficient data transfer and related integer and scalar operations.

The data processing units collected within an individual VPE may be further grouped within associated subsets. The example shown in FIG. 4 illustrates a plurality of VPEs, each having a plurality (e.g., four) of associated data processing subsets, termed a "Vector Processing Units " (VPU) 34. Each VPU preferably comprises dual (A & B) data processing units, wherein each data processing unit includes multiple floating-point execution units, multiple scalar processing units, at least one primary memory, and related data registers. This is a preferred embodiment, but those of ordinary skill in the art will recognize that the actual number and arrangement of data processing units is the subject of numerous design choices. For example, separate instruction and data memories are presently preferred, but this need not be the case.

The exemplary PPU architecture 30 of FIG. 4 generally comprises a high-bandwidth, main PPU memory 50, a Data Movement Engine (DME) 40 providing a data transfer path (s) between PPU main memory 50 (and/or a host system) and a plurality of Vector Processing Engines (VPEs) 32. A separate PPU Control Engine (PCE) 31 may be optionally provided to centralize overall control of the PPU and/or a data communications process between the PPU and host system.

Exemplary implementations for DME 40, PCE 31 and VPE 32 are given in the above referenced applications. As presently preferred, PCE 31 comprises an off-the-shelf RISC processor core and preferably a DMA controller. As presently preferred, PPU main memory 50 is dedicated to PPU operations and is configured to provide significant data bandwidth, as compared with conventional CPU/DRAM memory configurations (e.g., DDR, DDR2, RDRAM, GDDR3-type memories).

As an alternative to the programmable MCU approached described below, DME 40 may includes some control functionality (i.e., programmability) adapted to optimize data transfers to/from VPEs 32, for example. In another alternate embodiment, DME 40 comprises little more than a collection of cross-bar connections or multiplexors, for example, forming a data path between PPU main memory 50 and various memories internal to the plurality of VPEs 32. Data transfers between the PPU and host system will generally occur through a data communication port connected to DME 40. Alternatively, data communicated from the host system may be held in a data buffer (not shown). One or more of several conventional data communications protocols, such as PCI or PCI-Express, Firewire, or HyperTransport, may be used to communicate data between the PPU and host system.

Where incorporated within a PPU design, PCE 31 preferably manages all aspects of PPU operation. A programmable PPU Control Unit (PCU) 34 is used to store PCE control and communications programming. In one preferred embodiment, PCU 34 comprises a MIPS64 5Kf processor core from MIPS Technologies, Inc. In one related aspect, PCE 31 is typically assigned responsibility for managing the allocation and use of memory space in PPU main memory 50. Alternatively, PCE 31 might also manage the allocation and use of memory space in one or more memories internal to VPEs 32, as well as PPU memory 50, but this function is preferably assigned to a distributed set of Memory Control Units (MCUs). Execution of the physics subroutines controlling operation of VPEs 32 may be scheduled using programming resident in PCE 31 and/or DME 40, as well as the MCU described below.

The term "programmable memory control circuit" is used to broadly describe any circuit adapted to transfer, store and/or execute instruction code defining data transfer paths, moving data across a data path, storing data in a memory, or causing a logic circuit to execute a data processing operation. As presently preferred, each VPE 32 further comprises at least one programmable memory control circuit generally indicated in the preferred embodiment as MCU 33. The term MCU (and indeed the term "unit" generally) should not be read as drawing some kind of hardware box within the architecture described by the present invention. Indeed, MCU 33 controls more than just specific memory units in VPE 32 and might rightly be referred to as a vector control unit, but the control of data and instruction transfers between related memories in the PPU is an important function, and hence the term MCU will be used. In the embodiment shown in FIG. 4, multiple programmable MCUs are distributed across the plurality of VPEs.

Each VPE further comprises a plurality of grouped data processing units. In the illustrated example, each VPE 32 comprises four (4) VPUs 34 connected to a corresponding MCU 33. Alternatively, one or more additional programmable memory control circuit(s) is included within DME 40. In yet another alternative, the functions implemented by the distributed MCUs shown in FIG. 4 may be grouped into a centralized, programmable memory control circuit within DME 40 or PCE 31. This alternate embodiment allows removal of some memories and/or the corresponding memory control function from individual VPEs.

Wherever physically located, the MCU functionality essentially controls the transfer of data between PPU main memory 50 and the plurality of VPEs 32. Physics data is transferred directly from PPU main memory 50 to one or more memories associated with individual VPUs 34. Alternatively, data may be transferred from PPU main memory 50 to an intermediate (i.e., a "secondary") memory (e.g., an inter-engine memory, a scratch pad memory, and/or another memory associated with VPE 32), and thereafter transferred to a memory associated with an individual VPU 34.

In a related aspect, MCU functionality enables data transfers between PPU main memory 50, a primary memory 35, and one or more secondary memories 36 within VPE 32. Primary memory 35 (only one is shown in FIG. 4 for clarity) may be considered an "L1" type of memory and secondary memory 36 may be considered an "L2" type of memory, although such memories do not function as conventional caches.

Figure 5:
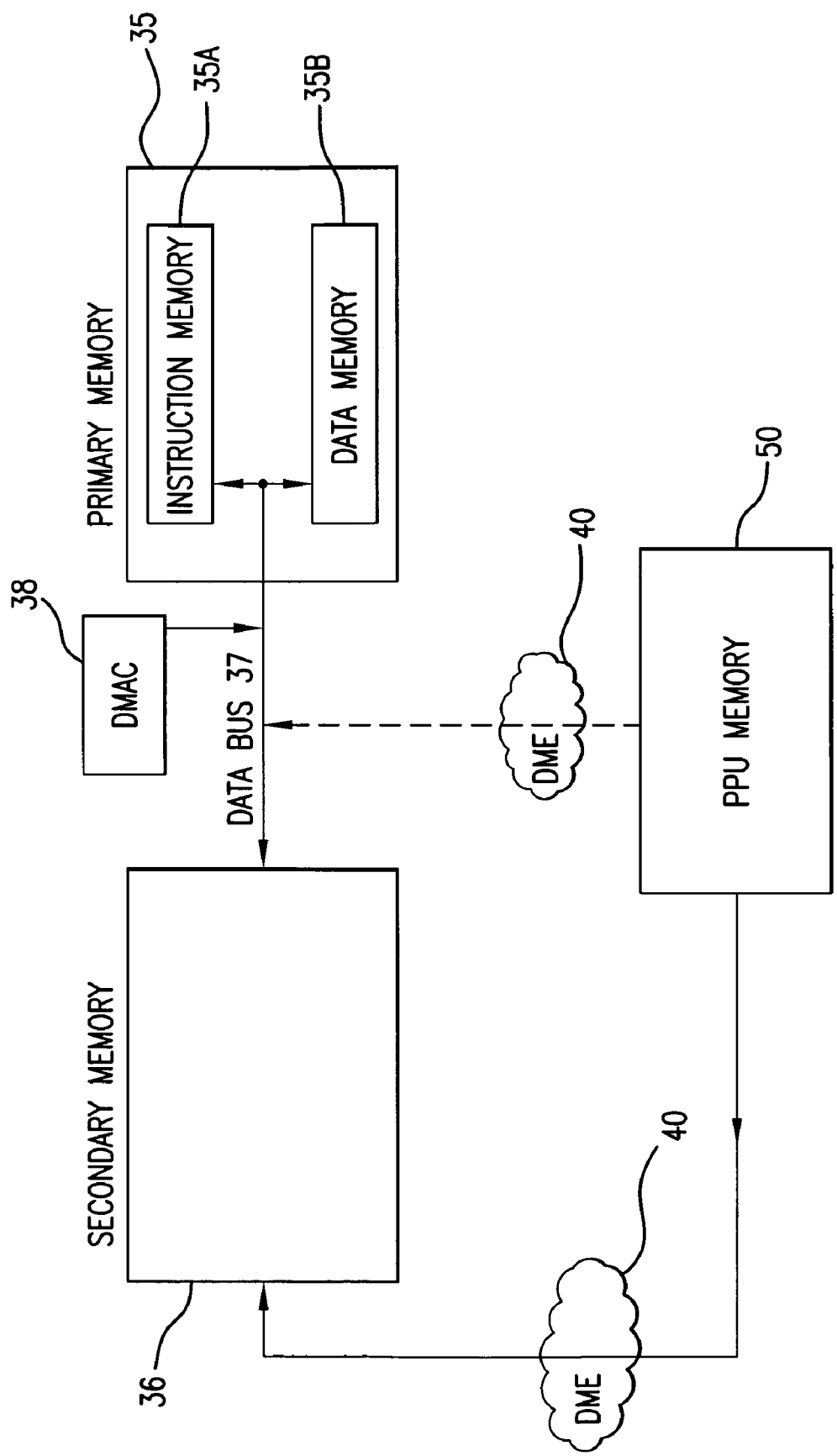
FIG. 5 further illustrates a heterogeneous memory architecture and related data transport mechanisms/controllers for an exemplary PPU enhanced system.

With reference to FIG. 5, and as presently preferred, primary memory 35 further comprises an instruction memory 35A and a data memory 35B. Secondary memory 36 may be similarly divided, but as presently preferred secondary memory stores both data and instructions. A "secondary memory" is defined as any intermediate memory associated with a VPE and/or DME between PPU main memory 50 and primary memory 35. Secondary memory 36 may transfer data to/from one or more of the primary memories 35 associated with one or more data processing units resident in a VPE 32.

In contrast, a "primary memory" is specifically associated with at least one data processing unit. In presently preferred embodiments, data transfers from one primary memory to another primary memory must typically flow through a secondary memory. While this implementation is not generally required, it allows a desirable simplifications in the hardware design.

Thus, primary memory 35 preferably receives both instruction data and physics data from secondary memory 36. Within the context of this particular description the term "physics data" includes not only data specifically derived or characterizing a physics relationship, but also all computationally related data, as opposed to data defining a programming instruction. Put in very general terms, instruction data stored in an instruction memory 35A acts upon physics data stored in a data memory 35B. In an alternative embodiment, primary memory 35 receives instruction data and/or physics data directly from PPU main memory 50 via DME 40 without used of an intervening secondary memory.

A conventional data bus 37 provides a data path between secondary memory 36 and primary memory 35. As presently preferred, DMAC 38 controls the transfer of data over the bus(es). A single, multiplexed data bus may be used, or separate data buses may be used to transfer instruction data and/or physics data between secondary memory 36 and primary memory 35. Buses may be bidirectional or unidirectional. As presently preferred, two (2) unidirectional buses are used.

Instruction data is preferably transferred from PPU main memory 50 to secondary memory 36, and then to primary memory 35. Similarly, physics data is preferably transferred from PPU main memory 50 to secondary memory 36, and then to primary memory 35. Data transfers are made using the any competent DME 40 with or without the capabilities provide by a DMAC.

Figure 6:
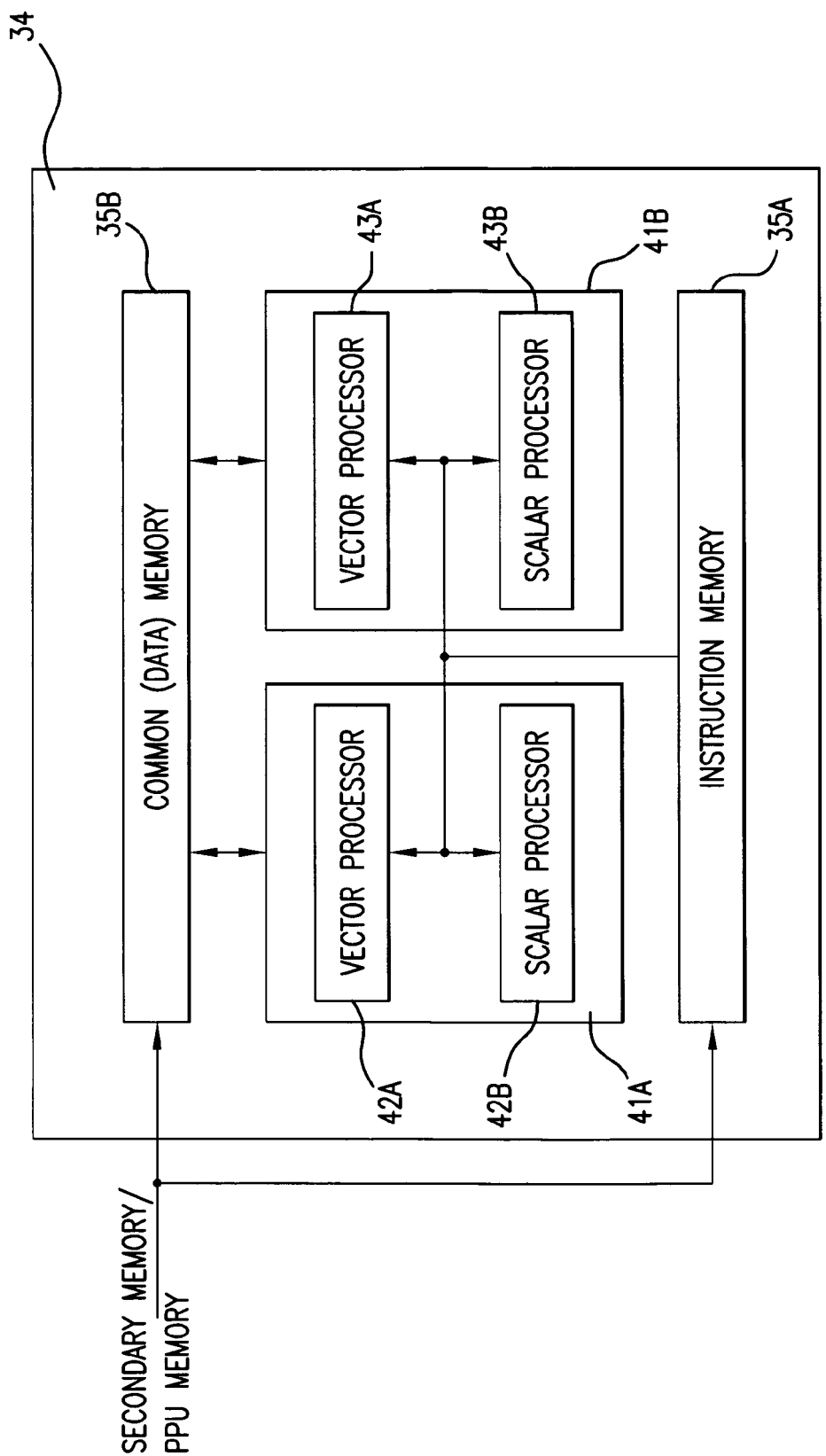
FIG. 6 further illustrates one presently preferred embodiment of the primary memory shown in FIG. 5.

FIG. 6 conceptually illustrates major functional components of a single VPU 34. In the illustrated example, VPU 34 comprises dual (A & B) data processing units 41A and 41B. As presently preferred, each data processing unit is a processor accessing instruction memory 35A, a conventional set of associated registers (not shown), and a program counter. VPU 34 also accesses a "common" memory comprising at least data memory 35B and associated registers (not shown). Dual data processing units 41A and 41B preferably share instruction memory 35A and data memory 35B. However, both instruction memory 35A and data memory 35B may be partitioned (by the used of separate memory devices or by address designation within a unitary memory device) to form individual memories assigned to respective data processing units. In one presently preferred embodiment, a dual bank of two (2) data memories 35B are each connected to data processing units 41A and 41B. Thus, either data processing unit 41A, 41B may access physics data from either data bank within memory 35B. However, each data processing unit 41A, 41B is associated with its own dedicated instruction memory 35A.

Each data processing unit 41A, 41B preferably comprises a vector processor 42A, 43A and a scalar processor 42B, 43B, respectively. Instructions for the vector processors and/or the scalar processors are queued in the instruction memory 35A awaiting execution by an assigned processor.

Parallel execution threads are preferably used by VPU 34, hence the dual access to a plurality of data memory banks. Each execution thread is controlled by a stream of instructions received from instruction memory 35A that enables floating-point and scalar operations to be performed on physics data received from the data memory 35A.

Figure 7:
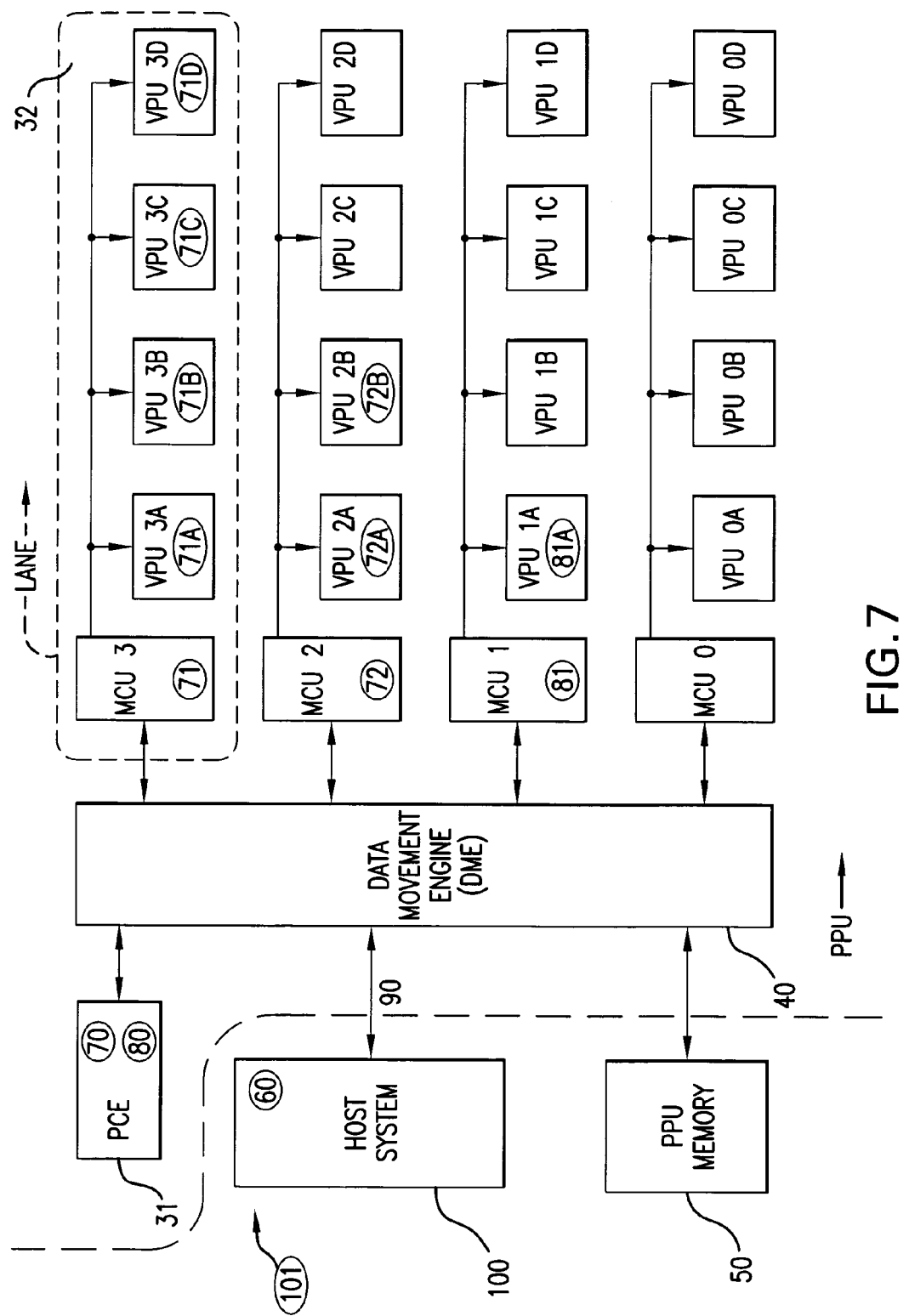
FIG. 7 still further illustrates relation of software packages and related modules to an exemplary PPU enhanced system.

Another embodiment of the exemplary PPU is shown in FIG. 7. FIG. 7 emphasizes several different aspects over the embodiment shown in FIG. 4. In FIG. 7, a host system 100 communicates with DME 40 via a communications channel 90. PPU main memory 50 and PCE 31 receive data from and transfer data to host system 100 via DME 40. Each VPE (e.g., 32) forms an individual "lane" into which and from which instruction data and physics data are transferred. For clarity, each lane is indicated by an MCU (0 through 3) and corresponding VPUs (e.g., VPU3A, VPU3B, VPU3C, and VPU3D are associated with MCU3).

An exemplary software package 101 comprises at least one host system-resident package portion 60 running on host system 100. Host system resident package portion 60 may be a single, independent module, such as an API, one or more module(s) related to a physics subroutine executed on the PPU, or one or more module(s) related to other host system-resident software. For example, host system-resident package portion 60 may be one or more north-facing module related to one or more south-facing modules stored in a main PPU memory.

In the working example, software package 101 further comprises two (2) PPU-resident Computational Modules (PCMs), 70 and 80. Each PCM typically comprises one PCE-resident module and zero or more Lane Computation Modules (LCMs). A "LCM" is any module adapted to run on PPU hardware resources associated with a vector processing engine, including for example, one or more data processing units having a vector processor and/or a scalar processor, and/or a MCU. Each LCM preferably comprises a MCU-resident module and zero or more VPU-resident modules.

As illustrated in FIG. 7, first PCM 70 comprises two LCMs 71 and 72, and related VPU-resident modules 71A-71D, 72A, and 72B. Accordingly, PCE-resident module 70 directs execution of MCU3-resident module 71 and MCU2-resident module 72. In turn, MCU3-resident module 71 cooperates in loading and directing the execution of VPU-resident modules 71A, 71B, 71C, and 71D, which are respectively stored in instruction memories associated with VPU3A, VPU3B, VPU3C, and VPU3D. In like manner, MCU2-resident module 72 cooperates in loading and directing the execution of VPU-resident modules 72A and 72B, which are respectively stored in instruction memories associated with VPU2A and VPU2B.

Second PCM (80, 81, and 81A) is associated with one single LCM 81. Accordingly, a PCE-resident module 80 directs execution of MCU1-resident module 81. In turn, MCU1-resident module 81 cooperates in loading and directing the execution of VPU-resident module 81A stored in the instruction memory associated with VPU1A.

Taken in cooperative combination host system-resident package portion 60, PCM 70, and PCM 70's associated LCMs (including MCU modules 71 and 72, and VPU modules 71A-71D and 72A-72B) implement the first module. Host system-resident package portion 60, PCM 80, and PCM's 80's associated LCMs (including MCU module 81, and VPU module 81A) implement the second module. Together, the first and second modules implement software package 101.

Figure 8:
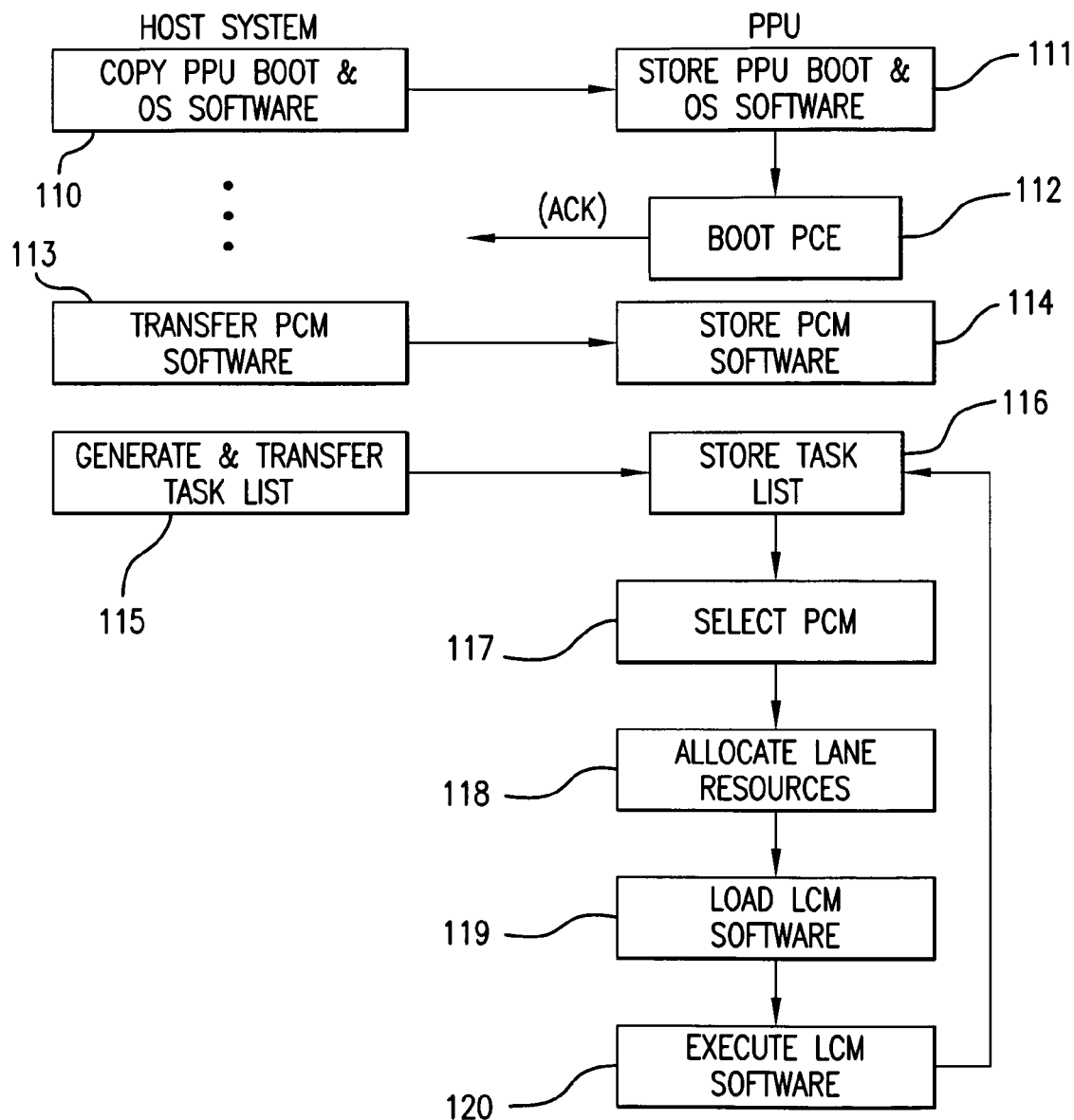
FIG. 8 is an exemplary partial flowchart illustrating interoperation between host system resident software and PPU resident Software; and, FIG. 9 is a related partial flowchart further illustrating several steps shown in FIG. 8.
Figure 9:
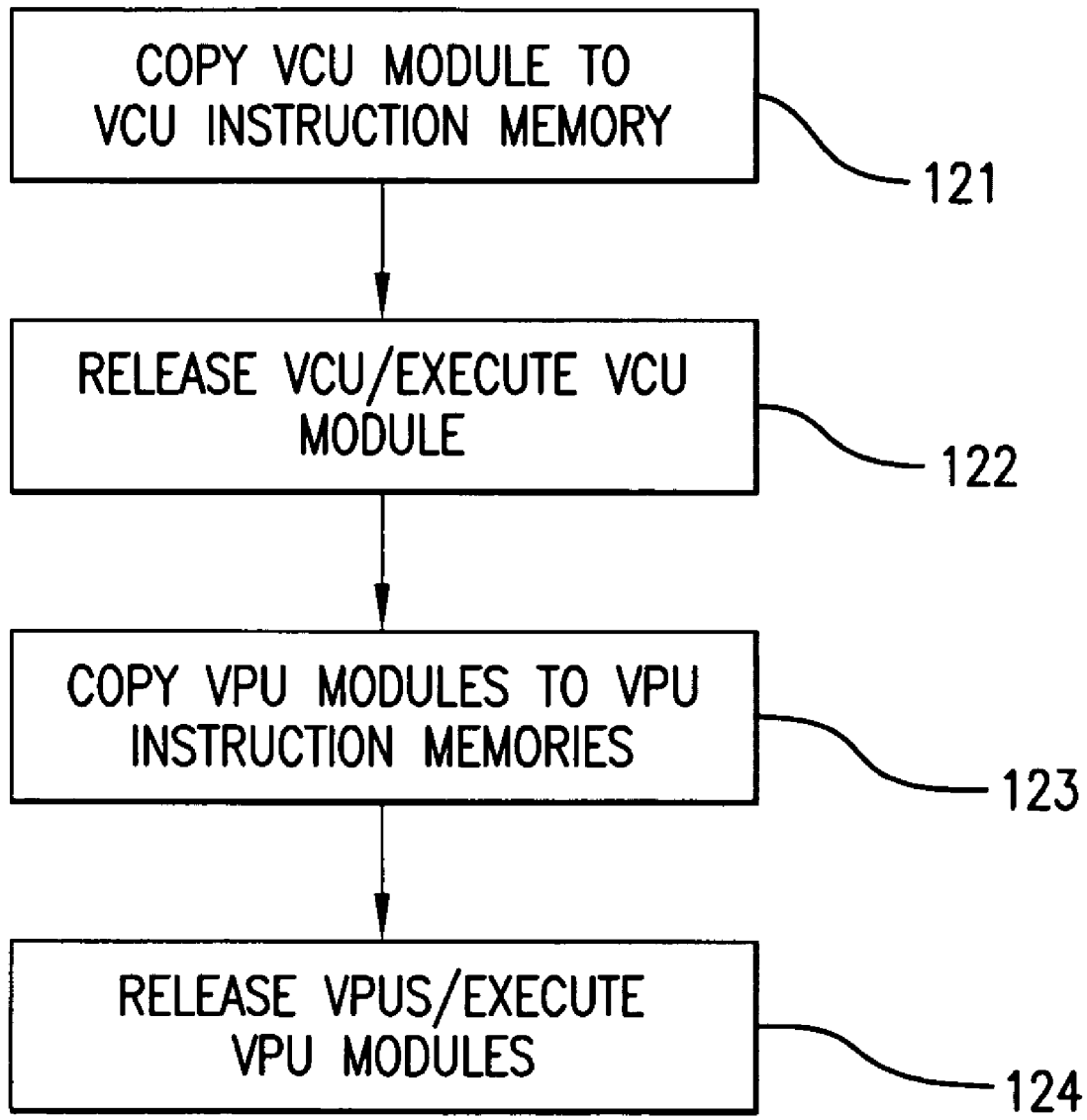

An exemplary method by which PPU-resident portions of software package 101 transfer programming code data (i.e., "PCM data") to the PPU will now be described in relation to the partial flowcharts shown in FIGS. 8 and 9. It is first assumed that the PPU is initially in a wait or reset state. The method thus begins when the host system copies PPU boot and/or PPU Operating System (OS) software from host system memory or a peripheral to the main PPU memory (110). Once the PCE boot and/or PCE OS is stored in PPU main memory (111), the PCE boots (i.e., is released from a reset state). After confirming the PCE release and proper PPU operation via an initialization verification routine (not shown), the PCE returns an acknowledge (ACK) signal to the host system.

Upon receiving the acknowledge signal, the host system understands that the PPU is ready to receive PCM software. PCM software may be transferred in its totality (i.e., all software related to all PCMs) during a single copy and transfer operation, or selected PCMs may be transferred in batches, or PCMs may be transferred on an "as-needed" basis. PCM software may be transferred between the host system and PPU using any competent data communications channel, for example, conventional DMA transfer techniques (113).

The PCM software received from the host system is preferably stored in main PPU memory (114). As presently contemplated, the PCE may directly execute software stored in main PPU memory, because the PCE comprises an on-chip instruction cache. However, the "lane elements," including the MCU and the VPUs, preferably do not have the ability to directly execute software stored in main PPU memory. Thus, the respective MCU and VPU elements require that their software be loaded in their dedicated instruction memories before execution is possible. Alternatively, of course, the MCU and VPU elements could be configured to directly access and execute software stored in PPU main memory, but this ability would dramatically slow the execution speed of the PPU for at least the reason that primary memory is much faster than even the high-speed main PPU memory contemplated by the present invention.

In addition to transferring PCM software to the PPU, the host system also generates a task list and transfers this task list to the PPU (115). During each animation frame, typically $\frac{1}{60}^{th}$ of a second, a set of PCMs will run. This set of PCMs may be drawn from one or more packages. Since the output of some PCMs are required as inputs to other PCMs, the PCMs in a given set typically require execution in a specific or prioritized order. The task list identifies all of the PCMs to be run during a particular frame, as well as their priority, dependencies, inputs, outputs, and/or resources requirements. Once the task list is received by the PPU, it is preferably stored in main PPU memory 50 and/or in a memory located on the PCE (116). The OS running on the PCE uses the task list to schedule a sequence of PCMs to run during the frame.

Accordingly to the priority of execution sequence established by the task list, the PCE selects a first PCM to be executed (117), and allocates lane resources (e.g., MCUs and VPUs) sufficient to run the first selected PCM (118). Multiple PCMs may be selected in a given cycle and allocated lane resources so long as lane resources are available. Once all lane resources are allocated to a particular PCM, the constituent LCMs are loaded into the allocated MCUs and VPUs (119). Once properly loaded each LCM is ready for execution by the computational/logic units associated with assigned MCU or VPU(s).

As presently preferred, LCMs are "loaded" by first transferring (e.g., copying) the corresponding software portions into an instruction memory associated with an MCU and/or a VPU. FIG. 9 further illustrates this process. The PCE having previously been loaded with a PCM load module, executes the load module to transfer MCU module software from PPU main memory to an instruction memory associated with an allocated MCU (121). Transfer of this software data from PPU to MCU instruction memory preferably occurs via an intermediate memory, such as a secondary memory resident with the MCU. Once the MCU module is loaded, the MCU is released by a command from the PCE and the MCU module is executed by computational/logic components associated with the MCU (122). Preferably by operation of the executed MCU module, software portions associated with one or more VPU modules are transferred from PPU main memory to or more VPU instruction memories (123) via one or more secondary memories. Once the VPU instruction memories are loaded, the respective VPUs are released and the corresponding VPU modules are executed (124).

In this manner the PPU-resident portions of the various packages enabling the requisite physics subroutines may be transferred from the host system to the PPU, and thereafter distributed across the PPU hardware resources for execution.

The foregoing explanation describe selected teaching embodiments of the present invention. Those of ordinary skill in the art will recognize that many variations and adaptations to these teaching example are possible. The scope of present invention is not limited to only the teaching embodiments, but is defined by the attached claims.

What is claimed is:

1. A system running a main application, and comprising:
   a host system comprising a Central Processing Unit (CPU) and a main memory, and
   a Physics Processing Unit (PPU) connected to the host system via a communications channel and associated with a main PPU memory;

wherein the host system stores at least one package implementing a physics subroutine, and wherein the at least one package comprises a host system-resident package portion stored in the main memory and a PPU-resident package portion comprising at least one PPU-resident Computational Module (PCM) stored in the main PPU memory.

2. The system of claim 1, wherein the host system further comprises:
one or more peripheral devices storing, at least in part, the at least one package.

3. The system of claim 1, wherein the main memory stores physics data generated by execution of the at least one package; and
wherein the host system further comprises a Graphics Processing Unit (GPU) and a display, wherein the GPU receives physics data from the main memory and renders a corresponding animation scene on the display.

4. The system of claim 1, wherein the at least one package comprises a plurality of packages, and wherein each one of the plurality of packages implements, at least in part, a physics subroutine.

5. The system of claim 4, wherein each one of the plurality of packages comprises a host-resident module stored in the main memory and a PCM stored in the main PPU memory.

6. The system of claim 5, wherein the at least one of the plurality of packages comprises a north bound Application Programming Interface (API) and at least one of the plurality of packages comprises a southbound API.

7. The system of claim 1, wherein the host system-resident package portion comprises a north-facing module interfacing with host system resources, and the PPU-resident package portion comprises a south-facing module controlled in its execution by the north-facing module and interfacing with PPU resources.

8. The system of claim 7, wherein the north-facing module comprises a northbound Application Programming Interface (API) and the south-facing module comprises a southbound API.

9. The system of claim 1, wherein the PPU further comprises:
a Data Movement Engine (DME) receiving data from the host system via the communications channel;
a PPU Control Engine (PCE) controlling operation of the PPU; and
a Vector Processing Engine (VPE) comprising a primary memory;
wherein the PCE transfers at least a portion of the at least one PCM from the PPU main memory to the primary memory via the DME.

10. The system of claim 9, wherein the VPE further comprises a secondary memory, and wherein the PCE transfers the portion of the at least one PCM from the PPU to the secondary memory.

11. The system of claim 10, wherein the primary memory comprises an instruction memory receiving the transferred portion of the at least one PCM.

12. The system of claim 10, wherein the VPE further comprises a Memory Control Unit (MCU) associated with the secondary memory; and
wherein the transferred portion of the at least one PCM is transferred from the secondary memory to the primary memory by operation of the MCU.

13. The system of claim 12, further comprising at least one Direct Memory Access Controller (DMAC) transferring data from the host system main memory to the PPU main memory, and from the PPU main memory to the secondary memory.

14. A system executing a main application on a host system and executing a physics subroutine on a Physics Processing Unit (PPU) at least partially in parallel with execution of the main application, wherein the host system comprises a Central Processing Unit (CPU) and a main memory, and the PPU is connected to the host system via a communications channel;
the PPU comprising; a main PPU memory, a PPU Control Engine (PCE), and a plurality of Vector Processing Engines (VPEs), each VPE forming a computation lane;
the system storing a package, wherein the package implements, at least in part, the physics subroutine and comprises a plurality of modules;
wherein the plurality of modules comprises; a host system-resident module stored in the main memory, and a PPU-resident Computation Module (PCM) stored at least in part in the main PPU memory.

15. The system of claim 14, wherein the PCM further comprises:
a PCE module stored in a memory associated with the PCE.

16. The system of claim 15, wherein the PCM further comprises:
a Lane Computation Module (LCM) stored in at least one memory associated with one of the plurality of VPEs.

17. The system of claim 16, wherein at least one of the plurality of VPEs comprises:
a Memory Control Unit (MCU) having an associated secondary memory; and a plurality of Vector Processing Units (VPUs), each VPU having an associated primary memory; and,
wherein the LCM further comprises a MCU module stored in the secondary memory, and a plurality of VPU modules respectively stored in a corresponding plurality of primary memories.

18. The system of claim 17, wherein each one of the corresponding plurality of primary memories comprises an instruction memory receiving a respective VPU module.

19. A method of loading at least one package implementing, at least in part, a physics subroutine on a system, the system comprising a host system and a Physics Processing Unit (PPU), wherein the package comprises a host system-resident module and a plurality of PPU-resident Computation Modules (PCMs), wherein the method comprises:
storing the host system-resident module in a main memory associated with the host system;
transferring the plurality of PCMs from the host system to the PPU; and,
storing the plurality of PCMs in a main PPU memory associated with the PPU.

20. The method of claim 19, wherein the system further comprises a peripheral storing the host system-resident module and the plurality of PCMs, and wherein the method further comprises:
retrieving the host system-resident module and the plurality of PCMs from the peripheral, before storing the host system-resident module in the main memory and transferring the plurality PCMs from the host system to the PPU.

21. The method of claim 20, further comprising:
storing the plurality of PCMs in the main memory before transferring the plurality PCMs from the host system to the PPU.

22. The method of claim 19, further comprising:
selecting a first PCM from the plurality of PCMs stored in the PPU memory; and,
allocating computational lane resources within the PPU in relation to the first selected PCM.

23. The method of claim 22, wherein the first PCM comprises a PPU Control Engine (PCE) module, and at least one Lane Computation Module (LCM).

24. The method of claim 23, wherein the PPU comprises:
the main PPU memory storing the plurality of PCMs,
the PCE directing operation of the PPU and having an associated PCE memory storing the PCE module, and,
a Vector Processing Engine (VPE) providing the computational lane resources and comprising at least one memory storing the at least one LCM.

25. The method of claim 24, wherein the at least one LCM comprises a Memory Control Unit (MCU) module and a plurality of Vector Processing Unit (VPU) modules; and,
wherein the VPE further comprises:
a Memory Control Unit (MCU) directing the transfer of data between the PPU main memory and a secondary memory associated with the MCU and storing the MCU module, and
a plurality of VPUs, each one of the plurality of VPUs having an associated primary memory respectively storing one of the plurality of VPU modules.

26. The method of claim 25, wherein selecting the first PCM from the plurality of PCMs further comprises:
generating in the host system a task list identifying the first PCM and at least a second PCM from the plurality of PCMs; and,
transferring the task list from the host system to the PPU.

27. The method of claim 26, wherein selecting the first PCM from the plurality of PCMs further comprises:
selecting the first PCM in relation to an execution priority associated with the first PCM in the task list.

28. The method of claim 27, further comprising:
selecting the second PCM from the plurality of PCMs in relation to the task list, upon completion the first PCM; and
re-allocating the computational lane resource within the PPU in relation to the second selected PCM.

29. A method of operating a Physics Processing Unit (PPU) enhanced system, the system comprising a host system and a PPU connected via a communication channel; wherein the host system comprises a Central Processing Unit (CPU), a main memory, and a peripheral device; and wherein the PPU comprises a PPU main memory, a PPU Control Engine (PCE), a Data Movement Engine (DME), and a plurality of Vector Processing Engines defining a corresponding plurality of lane resources, the method comprising:
copying at least one of a PPU boot module and a PPU Operating System (OS) from the peripheral to the main memory; and,
transferring the at least one PPU boot module and PPU OS from the main memory to the PPU via the communications channel.

30. The method of claim 29, further comprising:
storing at least one boot module and PPU OS in the main PPU memory;
transferring the at least one boot module and PPU OS from the main PPU memory to a memory associated with the PCE; and,
executing the at least one boot module and PPU OS in the PCE.

31. The method of claim 30, further comprising:
returning an acknowledge signal from the PPU to the host system following execution of the at least one boot module and PPU OS.

32. The method of claim 30, further comprising:
transferring a first plurality of PPU-resident Computational Modules (PCMs) from the main memory to the PPU main memory via the communications channel, wherein each one of the first plurality of PCMs comprises at least one Lane Computation Module (LCM).

33. The method of claim 32, further comprising:
copying a second plurality of PCMs from the peripheral device to the main memory.

34. The method of claim 32, further comprising:
generating a task list in relation to the first plurality of PCMs and transferring the task list to the PPU; and
executing the first plurality of PCMs in a sequence defined by the task list.

35. The method of claim 34, wherein executing the first plurality of PCMs in a sequence defined by the task list further comprises:
selecting a first PCM in the sequence;
allocating lane resources in relation to the first PCM;
transferring the LCM related to the first PCM from the PPU main memory to a primary memory associated with the allocated lane resources; and,
executing the LCM.

\* \* \* \* \*